US012474021B2

(12) United States Patent
Otaki et al.

(10) Patent No.: US 12,474,021 B2
(45) Date of Patent: Nov. 18, 2025

(54) RECEPTACLE, CALIBRATION DEVICE AND FILLING APPARATUS

(71) Applicant: Tatsuno Corporation, Tokyo (JP)

(72) Inventors: Tsutomu Otaki, Tokyo (JP); Takaaki Takeno, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 31 days.

(21) Appl. No.: 18/404,157

(22) Filed: Jan. 4, 2024

(65) Prior Publication Data

US 2024/0247760 A1 Jul. 25, 2024

(30) Foreign Application Priority Data

Jan. 24, 2023 (JP) ................................ 2023-008537

(51) Int. Cl.
*F17C 13/02* (2006.01)
*F17C 5/06* (2006.01)

(52) U.S. Cl.
CPC ................ *F17C 13/02* (2013.01); *F17C 5/06* (2013.01); *F17C 2221/012* (2013.01); *F17C 2250/0689* (2013.01); *F17C 2270/0184* (2013.01)

(58) Field of Classification Search
CPC ...... F17C 5/06; F17C 13/02; F17C 2221/012; F17C 2250/0689; F17C 2270/0184
See application file for complete search history.

(56) References Cited

U.S. PATENT DOCUMENTS 11,370,651 B2 * 6/2022 Natori ...................... F17C 5/06

FOREIGN PATENT DOCUMENTS

| | | | |
|---|---|---|---|
| CN | 111457245 | A | 7/2020 |
| JP | 6611026 | A | 11/2019 |
| JP | 6611026 | B1 | 11/2019 |
| JP | 2020118197 | A | 8/2020 |
| JP | 2020118293 | A | 8/2020 |

OTHER PUBLICATIONS

European Search Report for EP 24 15 3097; mailed Jun. 14, 2024.

* cited by examiner

*Primary Examiner* — Timothy L Maust
(74) *Attorney, Agent, or Firm* — Stetina Garred Brucker & Newboles

(57) ABSTRACT

To provide a calibration device reliably accomplish communication filling without a great deal of labor when filling gaseous fuel (e.g., hydrogen gas) from a filling apparatus (e.g., a hydrogen filling apparatus) to a device to be filled (e.g., a hydrogen tank of an FCV) via the calibration device, and so on. A calibration device 100 according to the present invention includes a flowmeter 1; a filling nozzle 2 connected to the flowmeter 1 through a pipe 4A, the filling nozzle 2 having a communication input part 2A that receives information from a side 30 to be filled as an optical signal; and a receptacle 3 connected to the flowmeter 1 through a pipe 4B, the receptacle 3 having a communication output part 3A that outputs the signal received from the communication input part 2A of the filling nozzle 2 to a filling nozzle side of a filling device 20 that fills gaseous fuel, wherein the communication output part 3A is movable in a central axis direction of the pipe 4B connected to the receptacle 3, and an optical signal is emitted from the communication output part 3A toward the central axis of the pipe 4B.

6 Claims, 11 Drawing Sheets

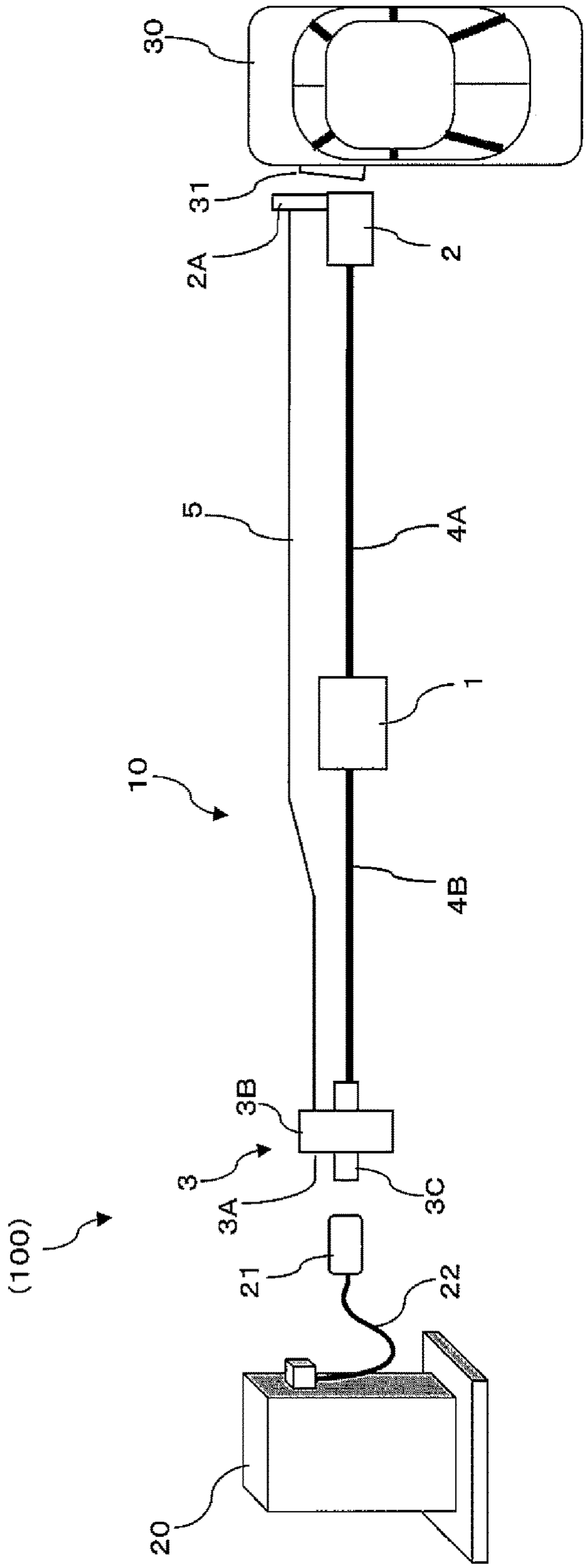
【Fig.1】

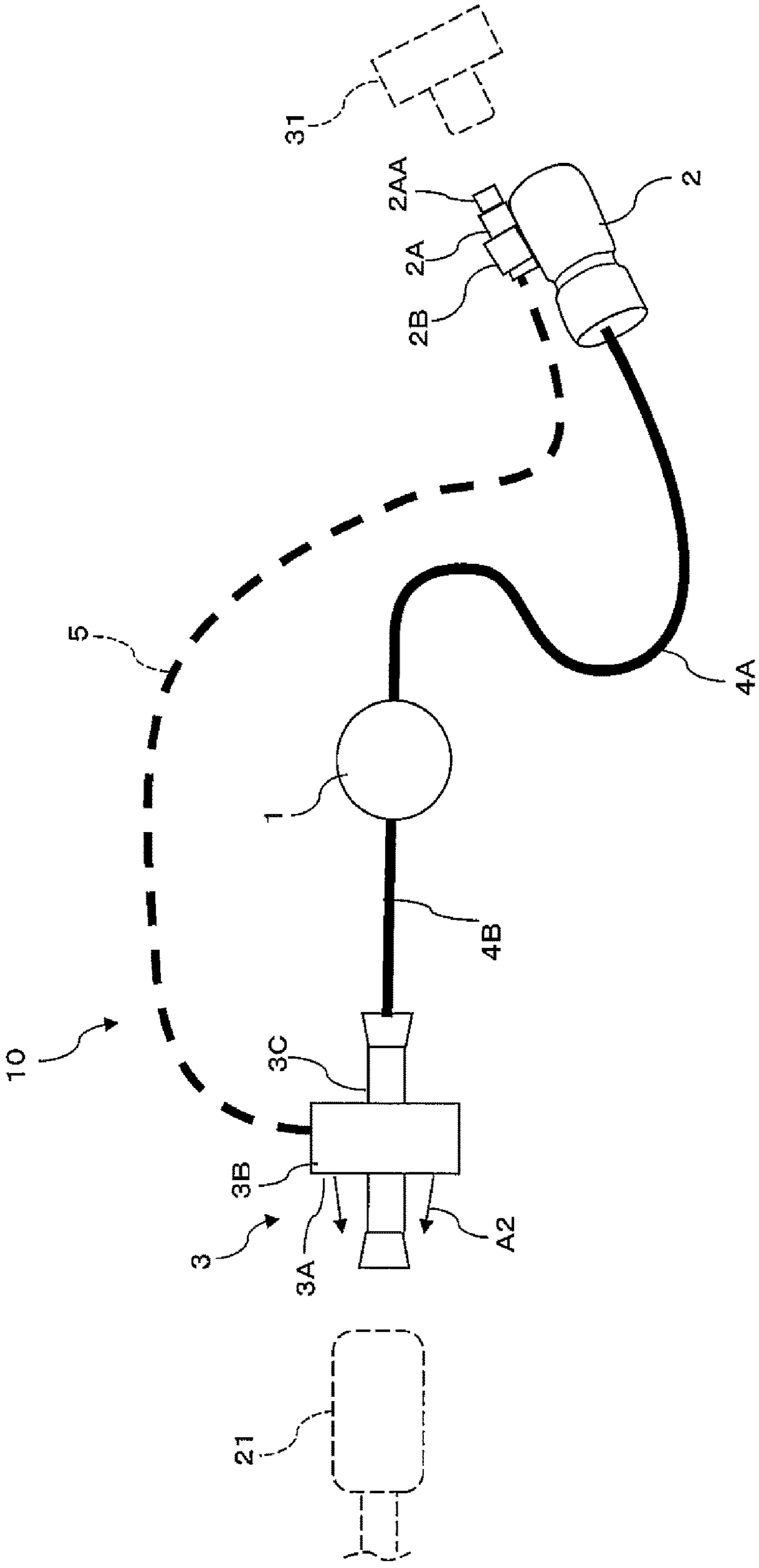
【Fig.2】

【Fig. 3】
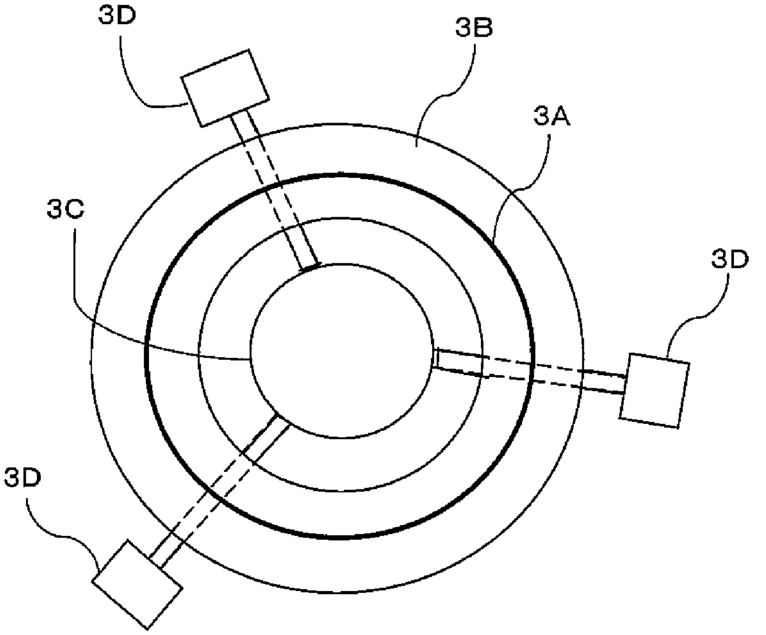
【Fig. 4】
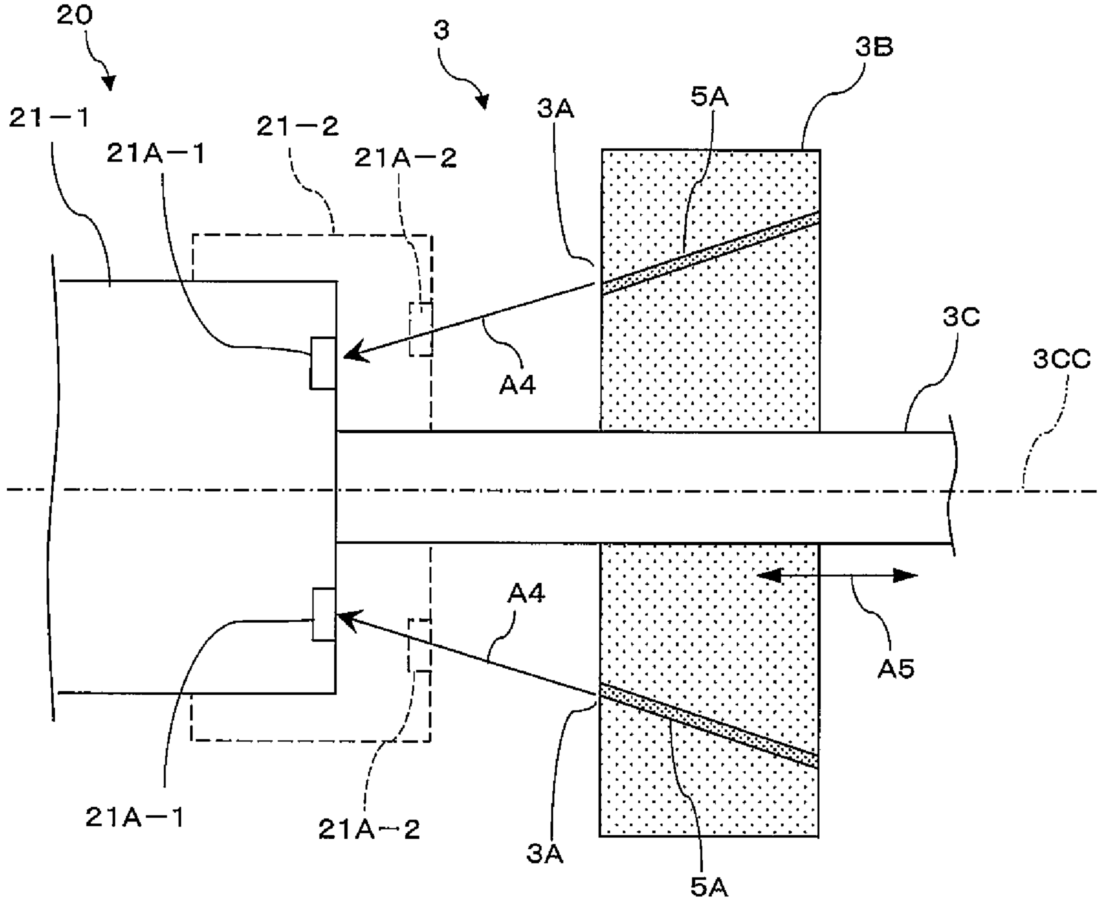

【Fig. 5A】
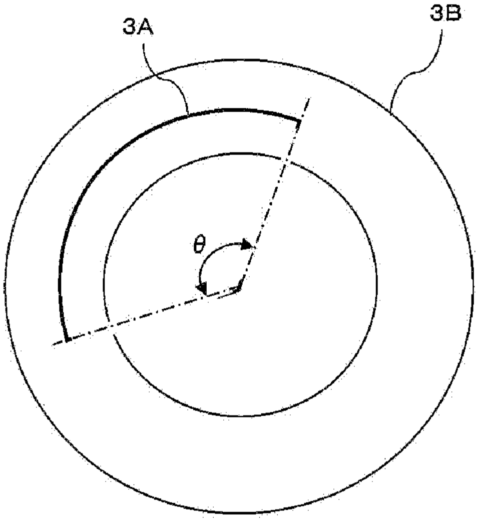
【Fig. 5B】
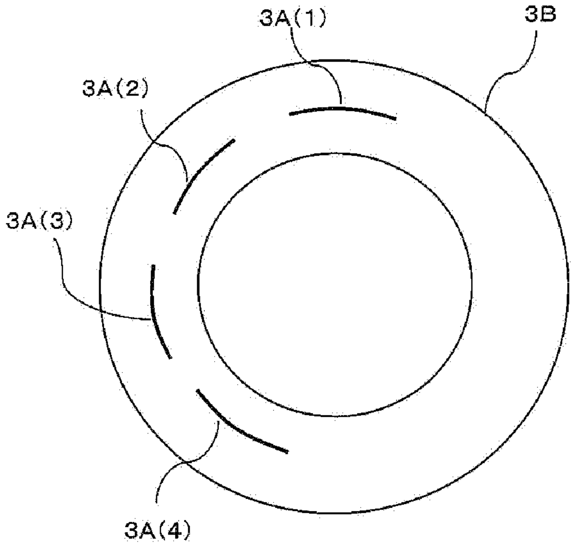

【Fig. 6】
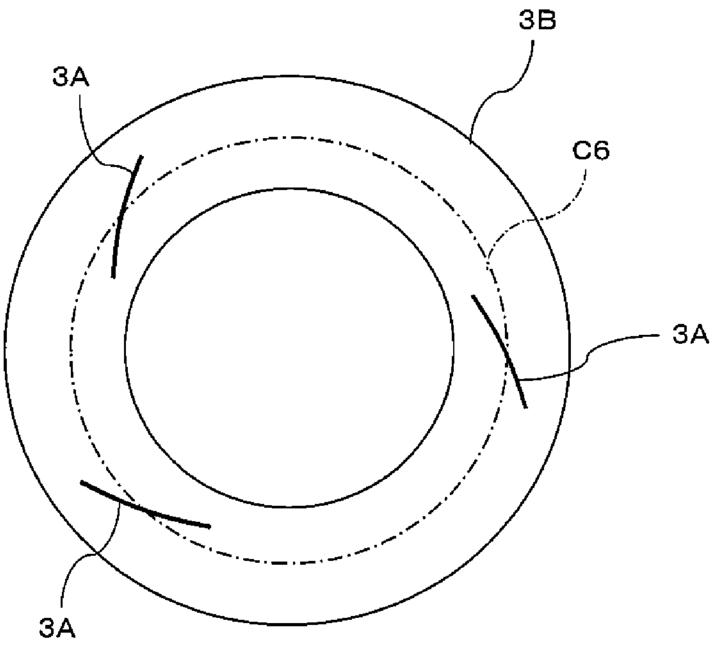

【Fig. 7A】
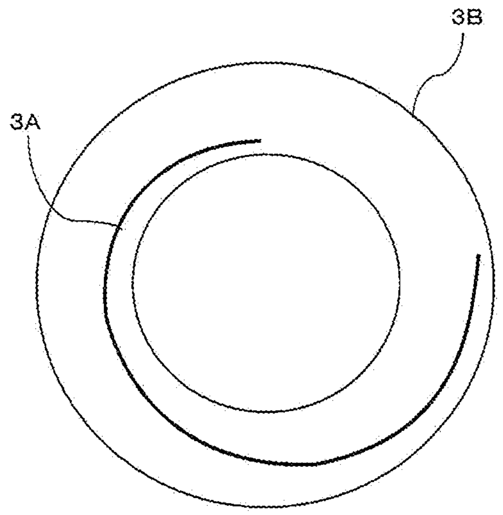
【Fig. 7B】
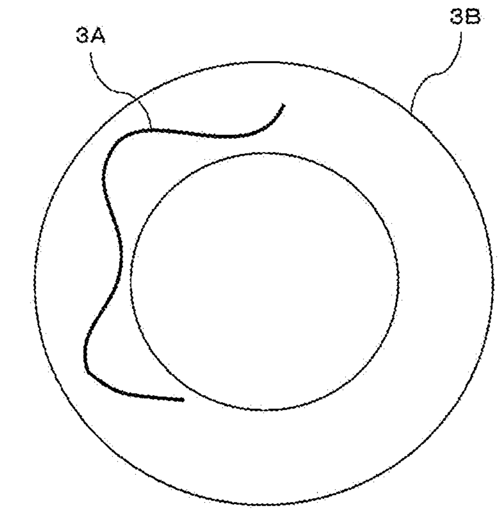

【Fig. 8】
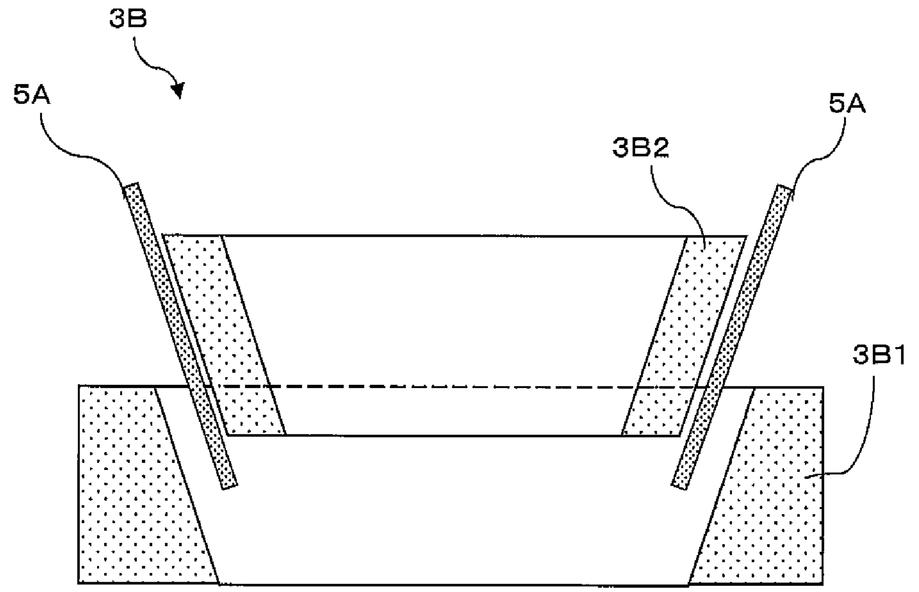
【Fig. 9】
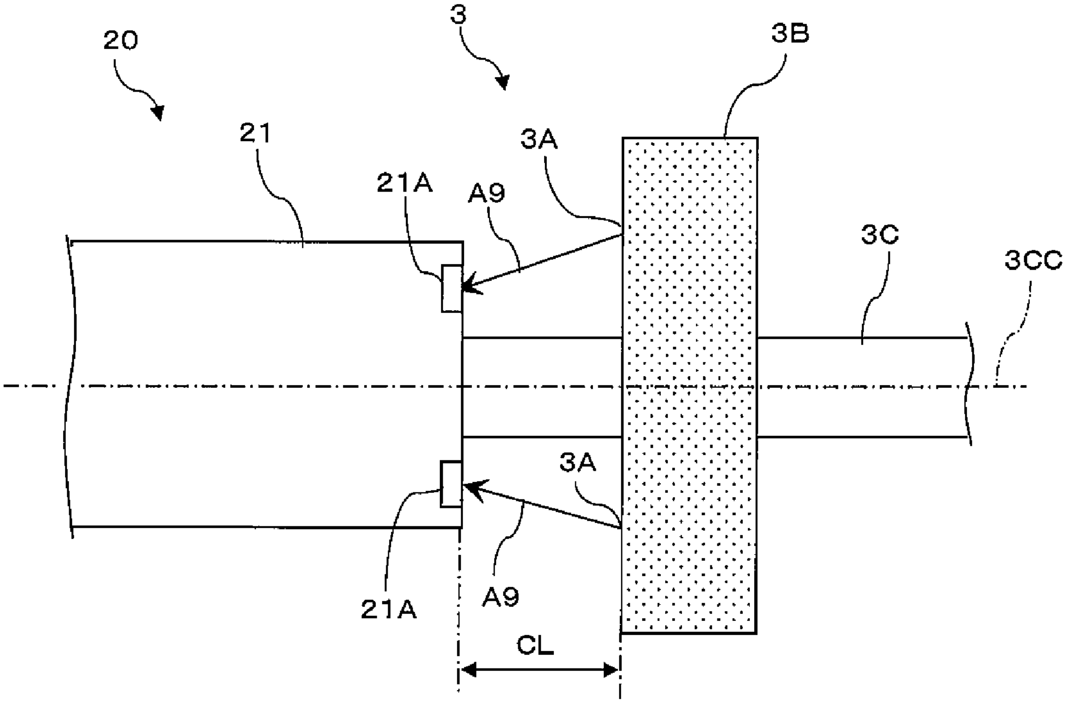

【Fig. 10】
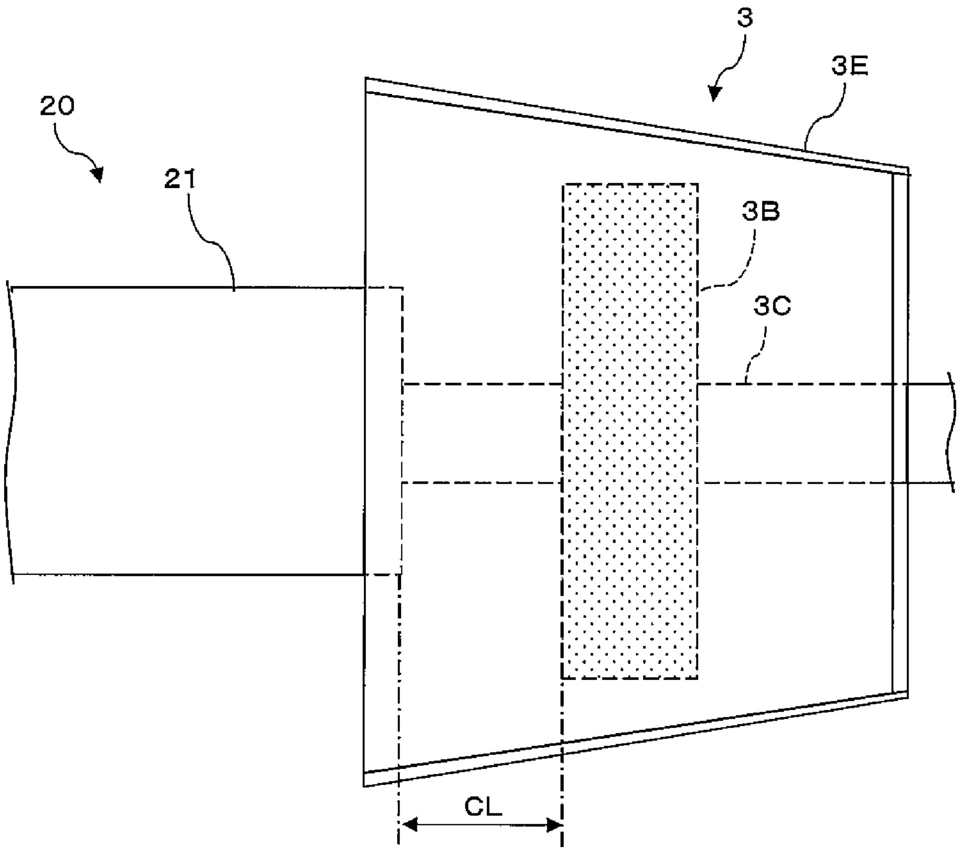
【Fig. 11】
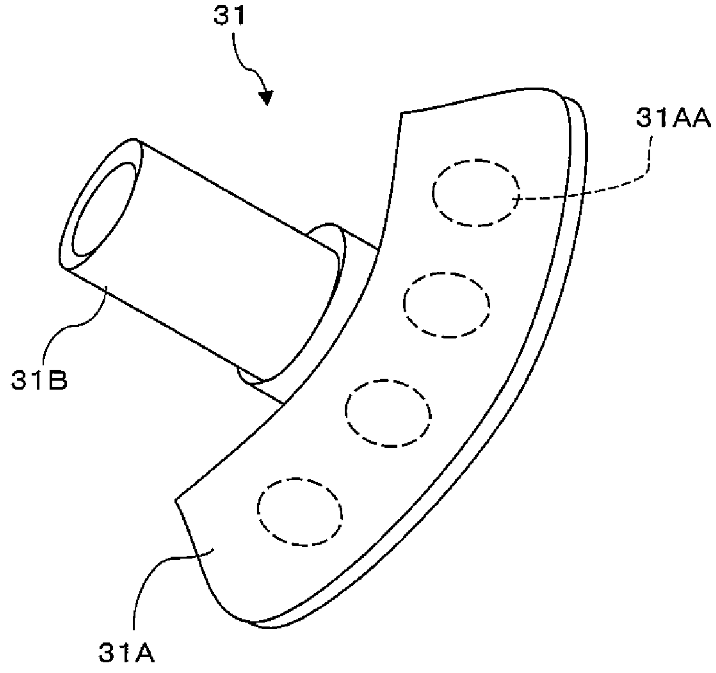

【Fig. 12】
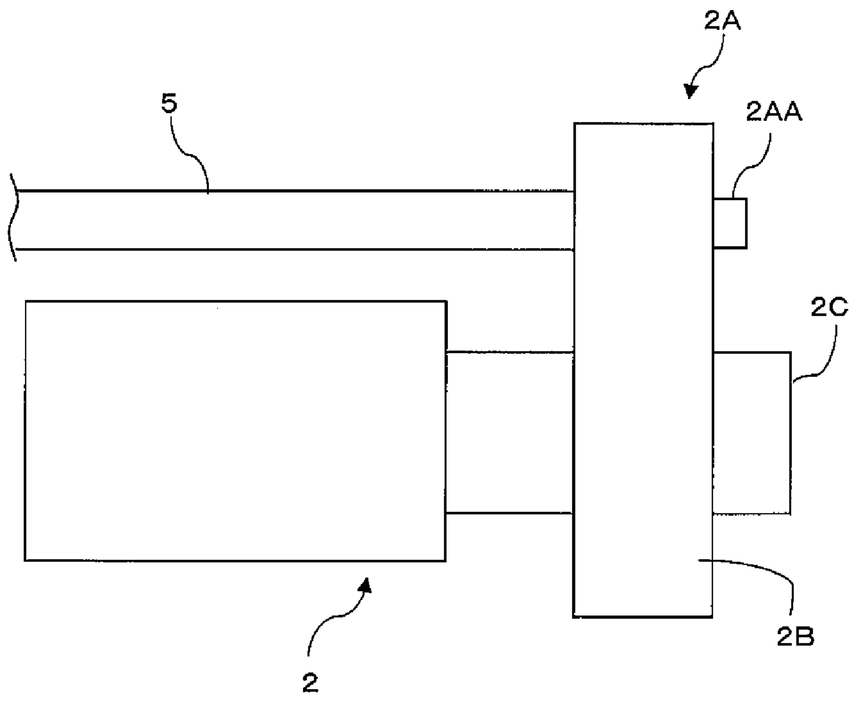

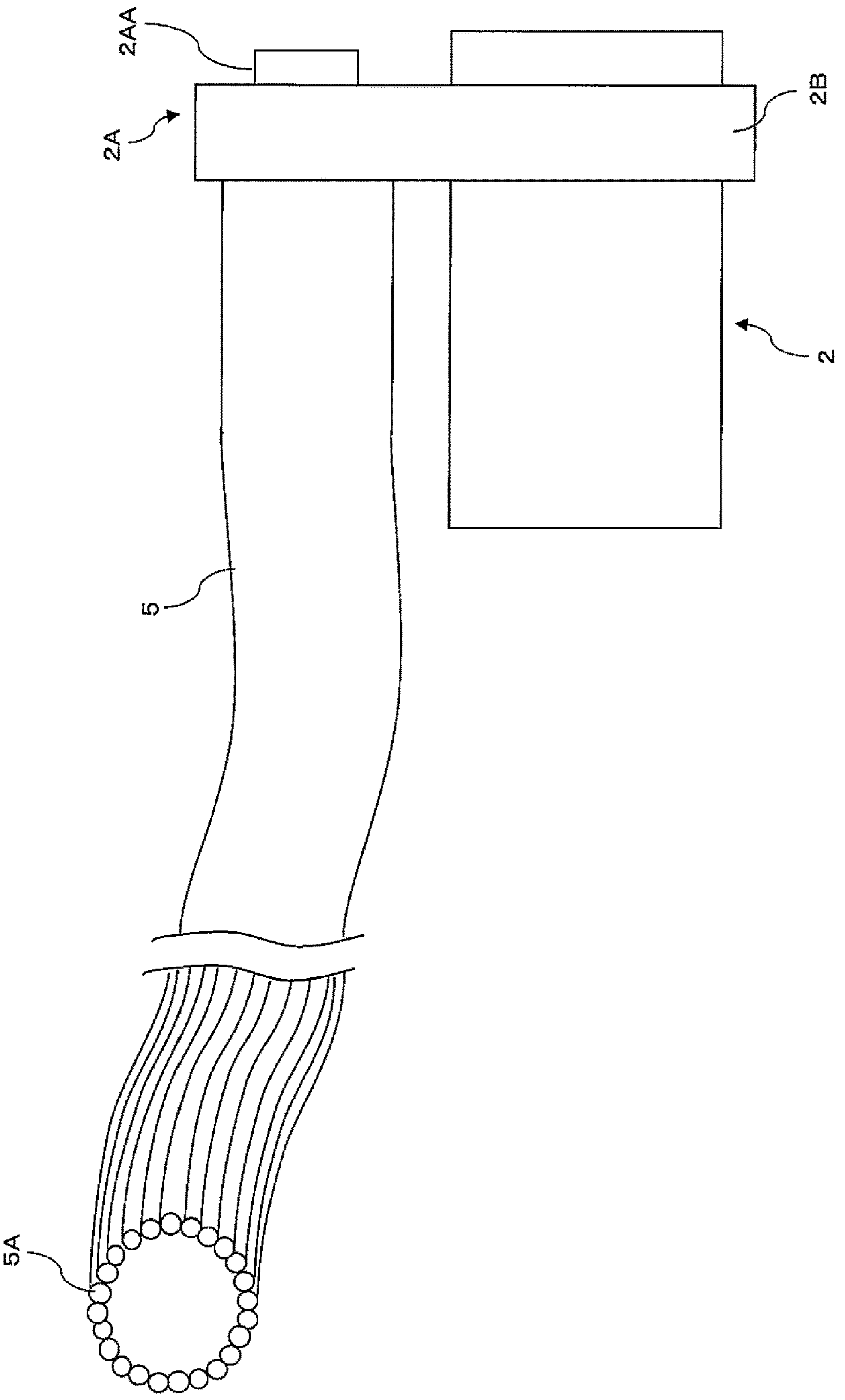
【Fig.13】

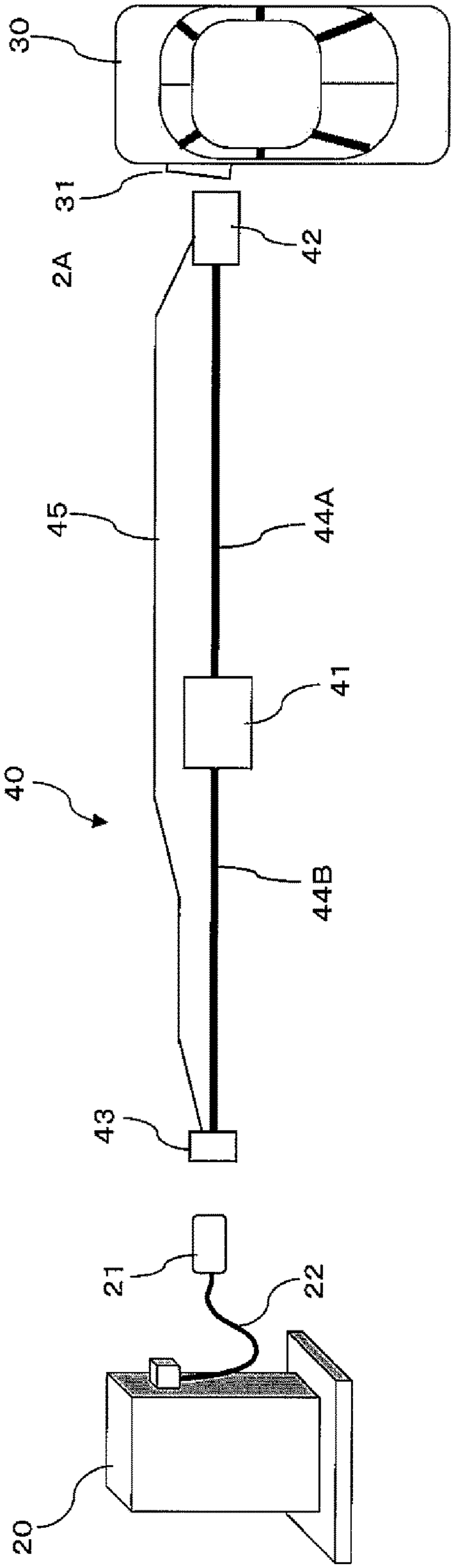
【Fig.14】

RECEPTACLE, CALIBRATION DEVICE AND FILLING APPARATUS

CROSS-REFERENCE TO RELATED APPLICATIONS

The present application claims priority to Japanese Patent Application No. 2023-008537 filed on Jan. 24, 2023, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a receptacle, a calibration device, and a filling apparatus used for calibrating a flow meter of a filling apparatus that fills a fuel cell vehicle (FCV) with gaseous fuel such as hydrogen gas.

2. Description of the Related Art

In FIG. 14 showing a conventional calibration device, a calibration device 40 described in JP-B-6611026 gazette, for example, includes a flowmeter 41 (master meter: Coriolis flowmeter, etc.), a filling nozzle 42, and a receptacle 43. The filling nozzle 42 can be connected to a receptacle 31 of an FCV 30. The receptacle 43 can be connected to a filling nozzle 21 of a hydrogen filling device 20. The calibration device 40 connects the filling nozzle 42 to the receptacle 31 of the FCV 30 and connects the filling nozzle 21 of the hydrogen filling device 20 to the receptacle 43. Then, calibration work of the hydrogen filling device 20 can be performed though fuel pipes 44A, 44B with the flowmeter 1 while filling the FCV 30 with gaseous fuel such as hydrogen gas. Here, since a filling pressure into a fuel tank of the FCV 30 is lower at 70 MPa for non-communicating filling compared to 82 MPa for communicating filling, so in the case of non-communicating filling, the filling amount is limited by outside temperature, and it may not be possible to fully fill the hydrogen tank. Therefore, even when filling the FCV 30 with hydrogen gas from the hydrogen filling device 20 via the calibration device 40, it is desirable that communication filling is established. In order to establish communication filling, it is necessary to configure that an optical signal related to information on the FCV side obtained from the filling nozzle 42 of the calibration device 40 via an optical fiber cable 45, the signal being transmitted from a light emitting part provided in the receptacle 43 of the calibration device 40, can be reliably received with a light receiving element provided in the filling nozzle 21 of the hydrogen filling device 20.

However, the position of the light receiving element in a radial direction and a circumferential direction of the filling nozzle 21 of the hydrogen filling device 20 differs depending on the manufacturer. Even when the filling nozzle 21 of the hydrogen filling device 20 is connected to the receptacle 43 of the calibration device 40, the light signal emitted from the light emitting part of the receptacle 43 of the calibration device 40 may not be received by the light receiving element of the filling nozzle 21 of the hydrogen filling device 20. Here, in order to ensure that the light signal emitted from the receptacle 43 side is received by the light receiving element on the filling nozzle 21 side, it is possible to provide a jig on the receptacle 43 side to adjust the position of the light emitting part that irradiates the light signal. However, it is necessary to install a different jig in the receptacle 43 depending on the manufacturer of the filling nozzle, and highly accurate work is required to adjust the position of the jig, so that the entire calibration work requires a lot of effort.

The content of JP-B-6611026 gazette is incorporated herein by reference in its entirety.

BRIEF SUMMARY

The present invention is proposed in view of the problems of the prior art described above, and the object thereof is to provide a receptacle, a calibration device, and a filling apparatus that can reliably accomplish communication filling without any problems nor a great deal of labor when filling gaseous fuel from a filling apparatus to a device to be filled via a calibration device.

A receptacle 3 of the present invention is connected to a pipe 4B, and the receptacle 3 includes a communication output part 3A that outputs a signal, and the communication output part 3A is movable in a central axis direction of the pipe 4B connected to the receptacle 3, and an optical signal is emitted from the communication output part 3A toward the central axis of the pipe 4B.

A calibration device 10 of the present invention includes a flowmeter 1 (master meter: Coriolis flowmeter, etc.); a filling nozzle 2 connected to the flowmeter 1 through a pipe 4A, the filling nozzle 2 having a communication input part 2A that receives information from a side 30 to be filled as an optical signal; and a receptacle 3 connected to the flowmeter 1 through a pipe 4B, the receptacle 3 having a communication output part 3A that outputs the signal received from the communication input part 2A of the filling nozzle 2 to a filling nozzle side of a filling device 20 that fills gaseous fuel, wherein the communication output part 3A is movable in a central axis direction of the pipe 4B connected to the receptacle 3, and an optical signal is emitted from the communication output part 3A toward the central axis of the pipe 4B.

Further, a filling apparatus 100 of the present invention is characterized by including a filling device 20 and a calibration device 10, and the calibration device 10 including a flowmeter 1; a filling nozzle 2 connected to the flowmeter 1 through a pipe 4A, the filling nozzle 2 having a communication input part 2A that receives information from a side 30 to be filled as an optical signal; and a receptacle 3 connected to the flowmeter 1 through a pipe 4B, the receptacle 3 having a communication output part 3A that outputs the signal received from the communication input part 2A of the filling nozzle 2 to a filling nozzle side of a filling device 20 that fills gaseous fuel, the communication output part 3A being movable in a central axis direction of the pipe 4B connected to the receptacle 3, and an optical signal being emitted from the communication output part 3A toward the central axis of the pipe 4B, wherein connecting the filling nozzle 2 of the calibration device to the receptacle 31 on the side 30 to be filled, and connecting the filling nozzle 21 on the filling device side to the calibration device 10 provide functions of calibrating the filling device 20 while filling it with gaseous fuel, and transmitting the optical signal from the side 30 being filled to the communication input part of the filling nozzle 21 on the filling device side to perform communication filling via a signal transmission means.

In the filling apparatus 100 of the present invention, a notification means can be provided to notify that communication filling has been established.

According to the receptacle 3 with the above-described configuration, the communication output part 3A is movable in the central axis direction of the pipe 4B connected to the receptacle 3, and an optical signal is transmitted from the communication output part 3A toward the central axis of the pipe 4B. With this configuration, when the distance between the communication output part 3A and the end face of the filling nozzle 21 on the side of the hydrogen filling device 20 changes, a radial position where the optical signal is irradiated on the end face also changes (see FIG. 4). Since the position of the connected filling nozzle 21 is fixed, adjusting the position in the central axis direction of the receptacle 3 enables that the distance between the communication output part 3A and the end face of the filling nozzle 21 is also adjusted, which allows the irradiation position of the optical signal to be aligned with the radial position of the light receiving element 21A of the filling nozzle 21. Therefore, regardless of the radial position of the light receiving element 21A, which varies depending on the manufacturer of the filling nozzle 21 on the side of the hydrogen filling device 20, the optical signal containing information on the side 30 to be filled with hydrogen gas, such as an FCV, is emitted from the communication output portion 3A and is reliably received by the light receiving element 21A of the filling nozzle 21 on the side of the hydrogen filling device 20, thereby establishing communication filling. That is, according to the present invention, an optical signal containing information about the side 30 to be filled can be reliably irradiated to the light receiving element 21A in the filling nozzle 21 on the side of the hydrogen filling device 20, which has different positions in the circumferential direction and/or radial direction depending on the manufacturer, and the information can be reliably transmitted to the hydrogen filling device 20 side.

Furthermore, providing the receptacle 3 in the calibration device 10 enables communication filling when the light receiving part 2A provided in the filling nozzle 2 is in a position where the part 2A is receivable the optical signal emitted from the light emitting element 31AA provided in the receptacle 31 on the side 30 to be filled. As described above, according to the present invention, when filling gaseous fuel from the hydrogen filling device 20 to the filling side 30 via the calibration device 10, it is possible to easily and reliably establish communication filling without using a special jig nor adjusting the same.

BRIEF DESCRIPTION OF THE DRAWINGS

FIG. 1 is an explanatory view showing a state that a calibration device according to an embodiment of the present invention is used.

FIG. 2 is an explanatory view showing the calibration device in FIG. 1.

FIG. 3 is an end view showing an annular member of the calibration device.

FIG. 4 is a view showing an action of the annular member.

FIGS. 5A and 5B are explanatory views illustrating arrangement of light emitting part in a circumferential direction in the annular member.

FIG. 6 is an explanatory view illustrating another arrangement of light emitting parts in the annular member.

FIGS. 7A and 7B are explanatory views illustrating other arrangements of a light emitting part in the annular member.

FIG. 8 is an exploded explanatory view for explaining a relative positional relationship between the annular member and an optical fiber.

FIG. 9 is an explanatory view showing a positional relationship between the filling nozzle of a hydrogen filling apparatus and the annular member.

FIG. 10 is an explanatory view showing a cover for preventing disturbance light.

FIG. 11 is an explanatory view showing a light emitting part of a receptacle on an FCV side.

FIG. 12 is an explanatory view showing a filling nozzle and a light receiving part of the calibration device.

FIG. 13 is an explanatory view showing an optical fiber that connects the light receiving part in the filling nozzle of the calibration device and the light emitting part of the annular member.

FIG. 14 is an explanatory view showing a conventional flow rate type calibration device.

DETAILED DESCRIPTION

Embodiments of the present invention will be described below with reference to FIGS. 1 to 13. In the illustrated embodiments, a case is shown in which an FCV 30 having a hydrogen tank is filled with hydrogen gas from a hydrogen filling device 20 via a calibration device 10. In this case, the calibration device 10 is separate from the hydrogen filling device 20. On the other hand, when the "hydrogen filling device 20" includes the "calibration device 10", it is written as the "hydrogen filling apparatus 100". In FIG. 1 showing a state that the calibration device 10 is used, the calibration device 10 includes a flow meter 1 (master meter: Coriolis flow meter, etc.), a filling nozzle 2 placed on the FCV 30 side, and a filling nozzle 21 placed on the hydrogen filling device 20 side, a receptacle 3, hydrogen gas pipes 4A and 4B that connect the filling nozzle 2 and the receptacle 3 via the flow meter 1, and an optical fiber cable 5 for connecting a light receiving part 2A of the filling nozzle 2 and a light emitting part (vehicle communication output part) 3A of the receptacle 3 to constitute a signal transmission system for optical signals. The filling nozzle 2 of the calibration device 10 is configured to be connectable to and detachable from the receptacle 31 on the FCV 30 side, and the receptacle 3 of the calibration device 10 is configured to be connectable to and detachable from the filling nozzle 21 of the hydrogen filling device 20.

The light receiving part 2A of the filling nozzle 2 of the calibration device 10 constitutes a communication input part that receives information on the FCV 30 side (for example, pressure and temperature inside the vehicle tank) from the receptacle 31 as an optical signal. Regarding transmission and reception of optical signals between the light receiving part 2A (a light receiving element 2AA: FIG. 12) of the filling nozzle 2 of the calibration device 10 and the light emitting element 31AA (FIG. 11) of the light emitting part 31A (FIG. 11) provided in the receptacle 31 on the FCV 30 side will be described later with reference to FIGS. 11 and 12. The light emitting part 3A of the receptacle 3 of the calibration device 10 constitutes a vehicle communication output part that outputs the optical signal received by the filling nozzle 2 of the calibration device 10 to the filling nozzle 21 of the hydrogen filling device 20. Transmission and reception of optical signals between the light emitting part 3A of the receptacle 3 of the calibration device 10 and the light receiving element 21A (FIG. 4) of the filling nozzle 21 on the side of the hydrogen filling device 20 will be described later with reference to FIGS. 3 and 4.

In FIG. 1, when calibration is performed using the calibration device 10, hydrogen gas is supplied from the hydrogen filling device 20 to an on-vehicle tank of the FCV 30 through a filling hose 22, the filling nozzle 21, and the receptacle 3 on the calibration device 10 side (a mounting member 3C, which will be described later and constitutes the receptacle 3), the hydrogen gas pipe 4B, the flow meter 1, the hydrogen gas pipe 4A, the filling nozzle 2 on the calibration device 10 side, and the receptacle 31 on the FCV 30 side. The flowmeter 1 accurately measures the amount of hydrogen gas filled. Thereby, the accuracy of the flow meter that measures hydrogen gas within the hydrogen filling device 20 can be evaluated. At that time, information (pressure, temperature) inside the on-vehicle tank of the FCV 30 is detected by a sensor (not shown) and is transmitted from the light emitting element 31AA (FIG. 11) of the light emitting part 31A (FIG. 11) provided in the receptacle 31 on the FCV 30 side to the hydrogen filling device 20 via the light receiving part 2A (the light receiving element 2AA, FIG. 12) of the filling nozzle 2 of the calibration device 10, the optical fiber cable 5, the light emitting part 3A (FIG. 4) of the receptacle 3 of the calibration device 10, and the light receiving element 21A (FIG. 4) of the filling nozzle 21 of the hydrogen filling device 20. Thus, communication filling is established.

As described above, the circumferential position and/or the radial position of the light receiving element 21A in the filling nozzle 21 of the hydrogen filling device 20 differs depending on the manufacturer. In the illustrated embodiment, in order to reliably irradiate the optical signal from the light emitting part 3A of the receptacle 3 of the calibration device 10, the annular member 3B is configured to be movable in the direction of the central axis of the mounting member 3C by the adjustment member 3D (see FIG. 3). Regarding the transmission and reception of optical signals between the light emitting part 3A on the calibration device 10 side and the light receiving element 21A on the filling nozzle 21 side, including functions and actions of the annular member 3B, the mounting member 3C, and the adjustment member 3D, will be described later with reference to see FIGS. 3, 4 and others. Although not clearly shown in the figures, a notification means for notifying that communication filling has been established can be provided in the filling nozzle 2 of the calibration device 10, a display (not shown) or in rear equipment. With the notification means, an operator can reliably confirm that communication filling has been established, the filling pressure is increased, and full filling is reliably performed.

In FIG. 2 showing details of the calibration device 10 according to the illustrated embodiment, members other than the calibration device 10, that is, the filling nozzle 21 of the hydrogen filling device 20 and the receptacle 31 of the FCV 30 are each indicated in broken lines. The light emitting part 3A of the receptacle 3 of the calibration device 10 is provided on the annular member 3B, and the annular member 3B is attached to the receptacle 3 with a mounting member 3C. In FIG. 2, an arrow A2 indicates a direction of the optical signal emitted from the light emitting part 3A. The light receiving part 2A of the filling nozzle 2 of the calibration device 10 is fixed to the filling nozzle 2 with a support member 2B. The light receiving element 2AA in the light receiving part 2A is arranged near the end of the FCV 30 on the receptacle 31 side.

Next, the annular member 3B provided in the receptacle 3 of the calibration device 10 will be described with reference to FIGS. 3 to 10. FIG. 3 shows the annular member 3B viewed from the filling nozzle side of the hydrogen filling apparatus. A light emitting part 3A is annularly arranged in a region radially inward from the outer peripheral edge of the annular member 3B. In FIG. 3, the annular member 3B has a plurality of adjustment bolts 3D (adjustment means: three in FIG. 3) arranged at equal intervals in a circumferential direction on its outer periphery. Tightening the adjustment bolt 3D and moving it radially inward allow the annular member 3B to be fixed and held with respect to the mounting member 3C. Loosening the adjustment bolts 3D causes the annular member 3B to be moved in the direction of the central axis of the mounting member 3C. The mounting member 3C is configured to be hollow, and its internal space constitutes a hydrogen flow path.

In FIG. 4 showing an action of the annular member 3B, two types of filling nozzles 21-1 and 21-2 have different radial positions of their respective light receiving elements 21A-1 and 21A-2. FIG. 4 shows relative positions of the two types of filling nozzles 21-1 and 21-2 and the annular member 3B. The filling nozzle 21-1 and its light receiving element 21A-1 are shown in solid lines, and the filling nozzle 21-2 and its light receiving element 21A-2 are shown in broken lines. In FIG. 4, an optical fiber cable 5 (see FIG. 13) constituting a bundle of a large number of optical fibers, which is a signal transmission member for optical signals, is arranged as an individual optical fiber 5A in the annular member 3B at a circumferential angle 100° or more, and constitutes the light emitting part 3A of the optical signal in the receptacle 3.

As shown in FIG. 4, the optical fiber 5A is arranged such that the filling nozzle 21 side (left side in FIG. 4) is located radially inward in the annular member 3B, and the side remote from the filling nozzle 21 (in FIG. 4, right side) is located radially outward. Therefore, the optical signal emitted from the light emitting part 3A of the annular member 3B is, as shown by arrows A4 in FIG. 4, directed radially inward (directed the central axis 3CC of the member 3C and the central axis of the hydrogen gas pipe 4B) toward the filling nozzle 21 side (left side in FIG. 4). Since an optical signal radiated inward in the radial direction has strong directivity, appropriate adjustment allows the optical signal to reliably be irradiated to the light receiving element 21A in the filling nozzle 21 of the hydrogen filling device 20. Since the position of the filling nozzle 21 on the hydrogen filling device 20 side when connected to the receptacle 3 of the calibration device 10 is fixed, adjusting the position of the mounting member 3C of the annular member 3B in the direction of the central axis 3CC (an arrow A5) enables the distance between the annular member 3B and the end face of the filling nozzle 21 in the direction of the central axis 3CC to be adjusted also. As described above, since the direction in which the optical signal is irradiated is constant, appropriately adjusting the distance between the annular member 3B and the end face of the filling nozzle 21 in the direction of the central axis 3CC allows the radial position of the light signal emitted from the light emitting part 3A of the annular member 3B to move. As a result, even if the position of the light receiving element 21A in the circumferential direction and/or radial direction of the filling nozzle 21 on the hydrogen filling device 20 side differs depending on the manufacturer, the optical signal emitted from the annular member 3B (for example, the optical signal (including information on the pressure and temperature inside the tank) is reliably received by the light receiving element 21A of the filling nozzle 21 on the side of the hydrogen filling device 20, and communication filling from the hydrogen filling device 20 to the FCV 30 is established. For this adjustment, there is no need for special jigs or complicated jig adjustment work, and communication filling can be easily performed.

As described above, moving the annular member 3B in the direction of the central axis 3CC of the mounting member 3C (the arrow A5) and adjusting the position of the annular member 3B allow the radial position of the optical signal emitted from the light emitting part 3A and that of any of the light receiving elements 21A-1 and 21A-2 of the filling nozzles 21-1 and 21-2 to be equalized. For example, if the filling nozzle 21-1 and the annular member 3B in the direction of the central axis 3CC relatively position as shown in the solid line in FIG. 4, the optical signal emitted from the light emitting part 3A of the annular member 3B is also irradiated to the radial position of the light receiving element 21A-1 of the filling nozzle 21-1. On the other hand, if the relative position of the light receiving element 21A-2 of the filling nozzle 21-2 and the light emitting part 3A of the annular member 3B in the central axis 3CC is as shown in the broken line in FIG. 4, the optical signal emitted from the light emitting part 3A of the annular member 3B is also irradiated to the radial position of the light receiving element 21A-2 of the filling nozzle 21-2.

The light emitting part 3A in the annular member 3B, that is, the end of the optical fiber 5A does not need to be arranged over the entire circumferential area of the end face of the annular member 3B on the filling nozzle 21 side (left side in FIG. 4). As a result of inventor's experiments, in the circumferential direction of the end face of the annular member 3B on the filling nozzle 21 side (the left side in FIG. 4), if the light emitting part 3A is located in an area or circumference where the central angle thereof is 100° or more or disposed over ⅓ or more of the entire area in the direction, the light receiving element 21A can reliably receive the optical signal emitted from the light emitting part 3A, regardless of the position of the light receiving element 21A in the circumferential direction. That is, even if the circumferential position of the light receiving element 21A on the filling nozzle 21 side differs depending on the manufacturer, arranging the light emitting part 3A on the calibration device 10 side such that the circumferential angle of which is 100° or more enables communication filling.

FIGS. 5(A) and 5(B) show an arrangement of the light emitting part 3A on the end surface of the annular member 3B. The light emitting part 3A may be arranged continuously over the central angle θ (θ≥100° as shown in FIG. 5(A), but may be arranged intermittently as shown in FIG. 5(B). If the sum of the central angles θ of the intermittently arranged light emitting parts 3A(1), 3A(2), 3A(3) and 3A(4) is 100° or more, information (pressure and temperature inside the vehicle tank) transmitted from the FCV 30 side can be reliably transmitted to the hydrogen filling device 20 side to establish communication filling.

Similarly, the light emitting part 3A on the end surface of the annular member 3B can be arranged parallel to the concentric circle C6 (indicated in a dash-dotted line in FIG. 6) of any annular member 3B. Instead of being arranged in parallel, they may be arranged at an angle with respect to the concentric circle C6, as shown in FIG. 6. Furthermore, as shown in FIG. 7(A), the radial position of the light emitting part 3A on the end face of the annular member 3B gradually increases, or the light emitting part 3A gradually moves outward in the radial direction, forming a so-called "spiral" shape. In addition, as shown in FIG. 7(B), the light emitting part 3A may be arranged so that the light emitting part 3A can be arranged such that the radial position of the light emitting part 3A on the end surface of the annular member 3B can be changed arbitrarily.

The arrangement of the optical fibers 5A within the annular member 3B will be explained with reference to FIG. 8. As shown in FIG. 8, the annular member 3B is composed of an outer member 3B1 and an inner member 3B2, and the inner peripheral surface of the outer member 3B1 and the outer peripheral surface of the inner member 3B2 are set to have complementary dimensions and shapes. As shown in FIG. 4, the inner circumferential surface of the outer member 3B1 and the outer circumferential surface of the inner member 3B2 are set such that the radial dimension becomes smaller as they approach the filling nozzle 21 side (as they approach the bottom in FIG. 8). Thereby, the irradiation direction of the optical signal explained in FIG. 4 is defined. When arranging the optical fiber 5A, the inner member 3B2 is inserted into the internal space of the outer member 3B1 with the optical fiber 5A positioned between the inner peripheral surface of the outer member 3B1 and the outer peripheral surface of the inner member 3B2. Thereby, each optical fiber 5A can be arranged on the end face of the annular member 3B.

As shown in FIG. 9, when the receptacle 3 of the calibration device 10 is connected to the filling nozzle 21 on the hydrogen filling device 20 side, a gap CL is formed between the annular member 3B and the filling nozzle 21 in the direction of the central axis 3CC of the mounting member 3C. There is a possibility that a disturbance factor, such as sunlight, to the optical signal (arrows A9) transmitted from the light emitting part 3A to the light receiving element 21A of the filling nozzle 21 may enter through the gap CL. In the illustrated embodiment, as shown in FIG. 10, a cover 3E having a generally truncated cone shape is provided to cover the gap CL. The shape of the cover 3E is set so as to efficiently avoid sunlight and the like from entering through the gap CL. Although not explicitly shown, the cover 3E is attached to the mounting member 3C by a conventionally known method. Providing the cover 3E prevents disturbance factors such as sunlight from entering through the gap CL and disturbing the optical signal. At the same time, the cover 3E can act as a mark or guide when connecting the filling nozzle 21 to the receptacle 3.

Next, with reference to FIGS. 11 and 12, the mechanism for securely receiving an optical signal containing information on the pressure and temperature inside the on-vehicle tank of the FCV 30 from the receptacle 31 on the FCV 30 to the filling nozzle 2 of the calibration device 10 will be explained. In FIG. 11, the receptacle 31 on the FCV 30 side is provided with a fan-shaped or broken annular light-emitting part 31A, and the light-emitting part 31A is provided with a plurality of (four in the embodiment) light-emitting elements 31AA. In FIG. 11, a joint part of the receptacle 3 with the filling nozzle 2 on the side of the calibration device 10 is indicated by the reference numeral 31B. During communication filling, an optical signal containing information on the FCV 30 side (pressure and temperature inside the vehicle tank) is transmitted from the light emitting element 31AA of the receptacle 31 to the light receiving element 2AA of the filling nozzle 2 on the calibration device 10 side. As shown in FIG. 12, a light receiving part 2A is attached to the filling nozzle 2 on the side of the calibration device 10 via a support part 2B. The light receiving part 2A constitutes a communication input part. The light receiving part 2A supports the optical fiber cable 5, and the light receiving element 2AA is arranged at an end of the optical fiber cable 5 (the end on the receptacle 31 side of the FCV 30: the right end in FIG. 12). In FIG. 12, the joint portion of the filling nozzle 2 with the receptacle 31 is indicated by the reference numeral 2C.

Here, in FIGS. 11 and 12, the settings of the shapes and dimensions of the light receiving part 2A and the supporting part 2B, and the arrangement of the light receiving element 2AA of the light receiving part 2A are set such that the optical signal emitted from any of the light emitting elements 31AA (information on the FCV 30 side, pressure and temperature of the vehicle tank) can always be received (a position at least partially matching with the light emitting element 31AA). Therefore, the optical signal containing the information of the FCV 30 is reliably received by the light receiving part 2A of the filling nozzle 2 of the calibration device 10.

In order to ensure that the light signal emitted from any of the four light emitting elements 31AA of the receptacle 31 on the FCV 30 side can always be received by the light receiving element 2AA, it is necessary to arrange the light receiving element 2AA based on hydrogen filling standards (SAE J2799 [2014]). More specifically, it is necessary to satisfy the contents of 4.2.1.1 to 4.2.1.6 and 4.2.2.1 to 4.2.2.5 of SAE J279 9 [2014].

Next, the optical fiber cable 5 will be explained with reference to FIG. 13. In FIG. 13, the optical fiber cable 5 is composed of a bundle of a large number of optical fibers, and the bundle is supported by the support portion 2B of the filling nozzle 2 on the calibration device 10 side. In addition, in FIG. 13, in order to explain the optical fiber cable 5, the optical fiber 5A and the optical fiber cable 5 are shown larger than the filling nozzle 2 and the support part 2B. The end of the optical fiber cable 5 on the filling nozzle 2 side (the right end in FIG. 13: the end on the receptacle 31 side of the FCV 30) constitutes the light receiving part 2A, in which the light receiving element 2AA is arranged. The end of the optical fiber cable 5 opposite to the filling nozzle 2 (the left end in FIG. 13: the filling nozzle 21 side of the hydrogen filling device 20) is connected to the annular member 3B of the calibration device 10 (not shown in FIG. 13). On the end face of the annular member 3B on the side of the filling nozzle 21, the individual optical fibers 5A are arranged in a circumferential direction of the annular member 3B to constitute the light emitting part 3A (FIG. 4).

It should be noted that the illustrated embodiments are merely examples, and are not intended to limit the technical scope of the present invention. For example, in the illustrated embodiments, an FCV is used as the device to be filled, a hydrogen filling apparatus is used as the filling apparatus, and hydrogen gas is used as the gaseous fuel, but the device to be filled is not limited to the FCV. Moreover, the gas to be filled is not limited to hydrogen gas. The present invention can also be applied to a filling apparatus having a function of supplying other gaseous fuels. Furthermore, in this specification, the hydrogen filling apparatus may be configured separately from the calibration device 10, as in the case where it is written as "hydrogen filling device 20", or it may be written as "hydrogen filling apparatus 100" when the calibration device 10 is included in the apparatus 100.

DESCRIPTION OF THE REFERENCE NUMERALS

1 flowmeter (master meter: Coriolis flowmeter, etc.)
2 filling nozzle of calibration device
2A light receiving part (communication input part)
2AA light receiving element
3 calibration device receptacle
3A light emitting part (vehicle communication output part)
3B annular member
3C mounting member
3D adjustment member
4 hydrogen gas pipe
5 optical fiber cable
10 calibration device
20 hydrogen filling device (not including calibration device 10 etc.)
21 filling nozzle
21A light receiving element of filling nozzle
30 fuel cell vehicle (FCV)
31 receptacle
31A light emitting part of receptacle
31AA light emitting element of receptacle
100 hydrogen filling apparatus (including calibration device 10, etc.)

The invention claimed is:

1. A calibration device comprising:

a flowmeter;

a filling nozzle connected to said flowmeter through a pipe, said filling nozzle having a communication input part that receives information from a side to be filled as an informational optical signal; and a receptacle connected to said flowmeter through a pipe, said receptacle having a mounting member and a communication output part coupled to the mounting member, the communication output part being configured to emit an output optical signal corresponding to the informational optical signal received from said communication input part of said filling nozzle to said filling nozzle side of a filling device that fills gaseous fuel, wherein said communication output part is translatable along the mounting member in a central axis direction of the pipe connected to the receptacle, and the output optical signal is emitted from said communication output part toward the central axis of the pipe.

2. A filling apparatus comprising a filling device and a calibration device, and said calibration device including a flowmeter; a filling nozzle connected to said flowmeter through a pipe, said filling nozzle having a communication input part that receives information from a side to be filled as an optical signal; and a receptacle connected to said flowmeter through a pipe, said receptacle having a communication output part that outputs the signal received from said communication input part of said filling nozzle to a filling nozzle side of a filling device that fills gaseous fuel, said communication output part being translatable in a central axis direction of the pipe connected to the receptacle, and an optical signal being emitted from said communication output part toward the central axis of the pipe, wherein connecting said filling nozzle of the calibration device to the receptacle on the side to be filled, and connecting said filling nozzle on a filling device side to the calibration device provides functions of calibrating the filling device while filling it with gaseous fuel, and transmitting the optical signal from the side being filled to said communication input part of said filling nozzle on the filling device side to perform communication filling via a signal transmission means.

3. The filling apparatus as claimed in claim 1, wherein the communication output part is of an annular configuration.

4. The filling apparatus as claimed in claim 1, wherein the mounting member is of an axial configuration.

5. The filling apparatus as claimed in claim 1, wherein communication output part is configured to transmit the output optical signal at an angle relative to the central axis.

6. The filling apparatus as claimed in claim 2 further comprising a notification means for notifying that communication filling has been established.

* * * * *